F. J. HESS.
POSITION INDICATOR.
APPLICATION FILED SEPT. 7, 1921.
1,431,797.
Patented Oct. 10, 1922.
2 SHEETS—SHEET 1.
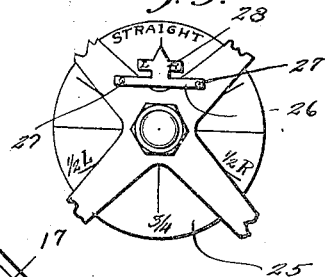
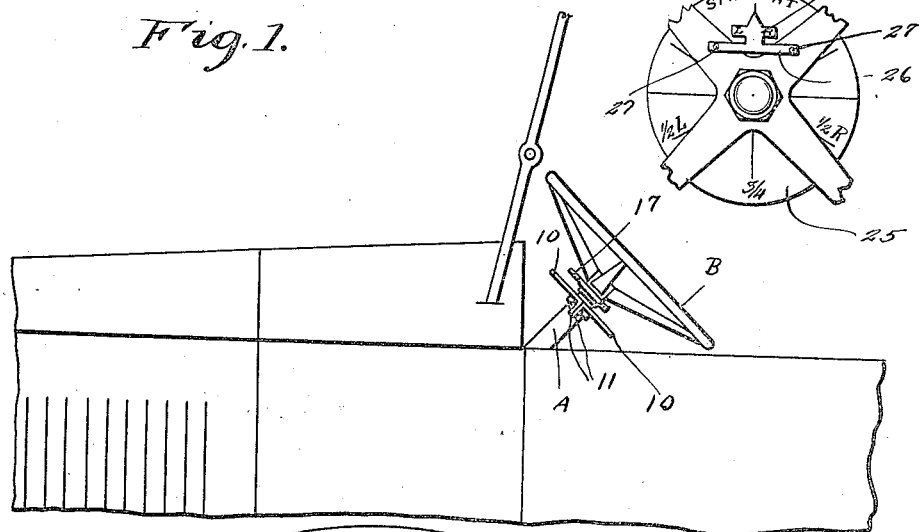
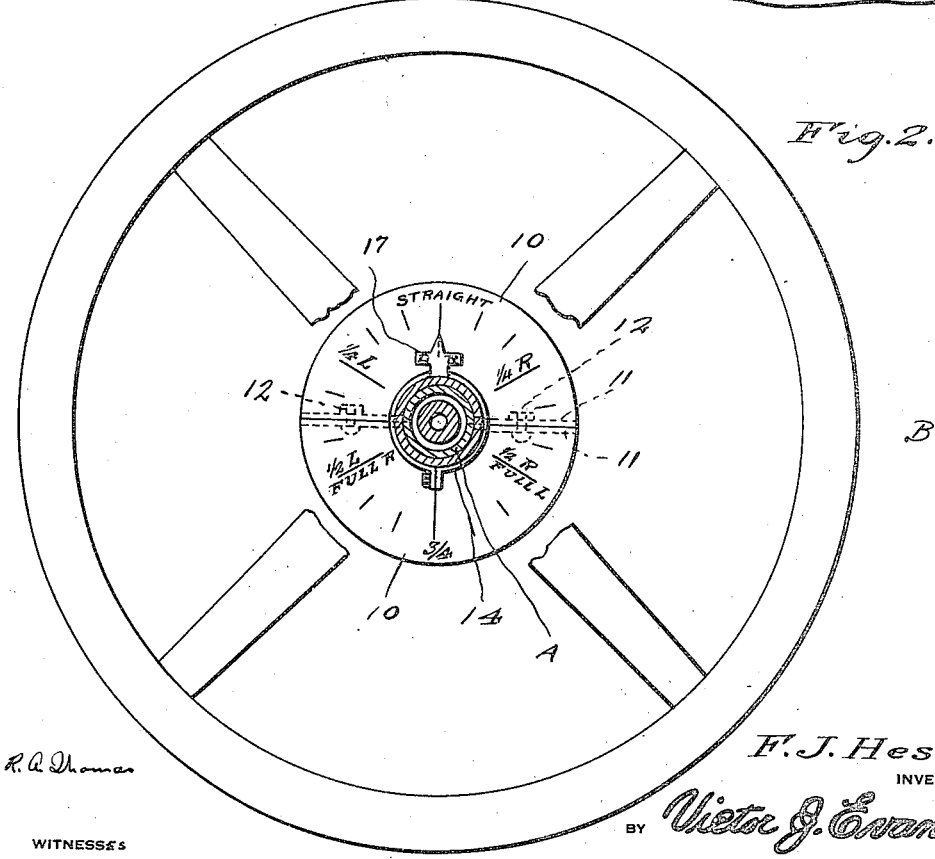
F. J. Hess
INVENTOR

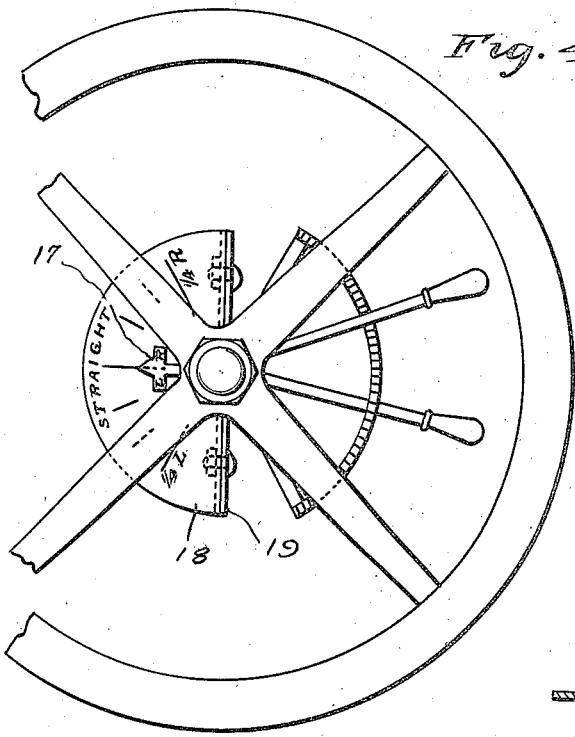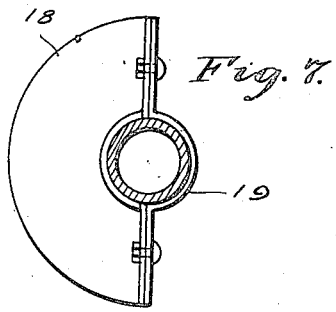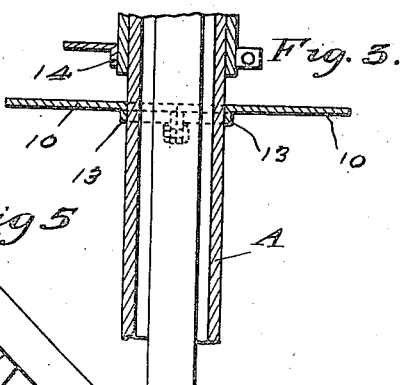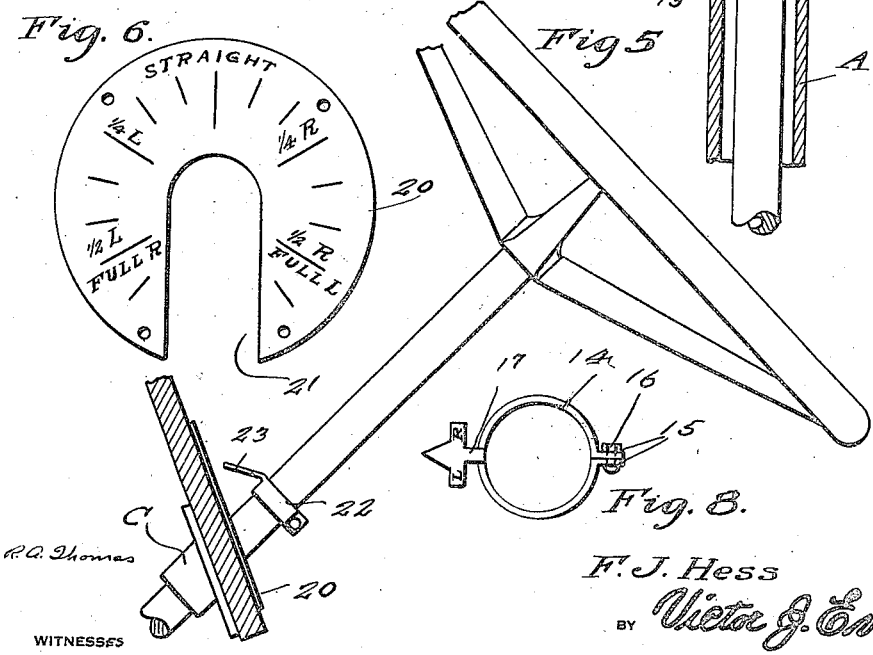

Patented Oct. 10, 1922.

1,431,797

UNITED STATES PATENT OFFICE.

FRANK J. HESS, OF ENID, OKLAHOMA.

POSITION INDICATOR.

Application filed September 7, 1921. Serial No. 498,990.

*To all whom it may concern:*

Be it known that I, FRANK J. HESS, a citizen of the United States, residing at Enid, in the county of Garfield and State of Oklahoma, have invented new and useful Improvements in Position Indicators, of which the following is a specification.

This invention relates to indicating devices, particularly to attachments for motor vehicles including trucks, tractors and automobiles, and has for its object the provision of means associated with the steering wheel or steering column whereby the operator may know definitely the exact position or angle in which the front wheels of the vehicle are disposed; it being well known that in attempting to get away from the curb after parking in the city, or in attempting to steer out of a rut, or in backing, in skidding or in various other emergencies it is highly desirable that the operator of the vehicle know the exact location or direction of the front wheels in order to avoid accidents.

An important and more specific object is the provision of an indicating device which is associated with the steering wheel or steering column in some types of automobiles or with the dash in other types of automobiles, my indicating device including a movable element securely clamped with respect to the steering wheel and cooperating with an indicating member secured upon the steering column or dash as the case may be whereby to apprise the operator of the exact direction or angle of the front wheels.

An additional object is the provision of a device of this character which will be simple and inexpensive in manufacture, which may be quickly and easily installed upon an already existing motor vehicle, which will be highly efficient in use, positive in action, durable and a general improvement of the art.

With the above and other objects and advantages in view, the invention consists in the details of construction to be hereinafter more fully described and claimed and illustrated in the accompanying drawings in which, Figure 1 is a side elevation of a portion of the front of an automobile showing my device associated with the steering column thereof, the type of steering column being that which is stationary, Figure 2 is a view looking down upon the steering wheel and showing the mechanism associated therewith and cooperating with the indicator, Figure 3 is a detailed longitudinal sectional view through the steering column showing my device secured thereupon.

Figure 4 is a detail view showing a modified form of the invention,

Figure 5 is an elevation of the type of an automobile in which the steering column turns and showing my device as modified for association therewith, Figure 6 is a plan view of the disk used in Figure 5.

Figure 7 is a detail view of the disk shown in Figure 4. Figure 8 is a detail view of the pointer shown in Figures 3 and 5, and Figure 9 is a view showing still another modification.

Referring more particularly to the drawings, and particularly to the form of the device shown in Figures 1 to 3 inclusive, the letter A designates the steering column of an automobile, this column being of the type which is stationary, and B designates the steering wheel which is rotatable upon and with respect to the upper end of the steering column A. In carrying out my invention I provide a disc like member formed of two similar semi-circular sections 10 which are engaged upon the upper end of the steering column A. These sections 10 are formed at their meeting edges with downturned flanges 11 which are secured together as by means of bolts 12 or the like. Each section is of course formed with a semi-circular recess adapted to engage against the steering column and at these recesses the sections are formed with curved flanges 13 which matingly constitute a circular flange and embracingly engaging the steering column. Near its periphery, the disk formed by the assembled sections 10 is provided with a plurality of graduations adjacent which may be located any desired legends indicating the position of the front wheels of the vehicle equipped with my device. It will be observed that there are six major graduations between which are preferably located a plurality of intermediate or minor graduations.

Associated with the steering wheel B is an indicator comprising a split ring 14 which is embracingly engaged upon the hub of the steering wheel and which has its ends formed with out-turned flanges 15 secured together as by means of a suitable bolt 16. Formed or secured upon this split ring 14 is a pointer 17 which cooperates and moves over the graduations on the disk carried by the steering column. It is of course to be understood that when the parts of my device are assembled, the disk on the column and the pointer 17 on the hub of the steering wheel should be so arranged with relation to each other that when the wheels of the vehicle are facing straight ahead the pointer 17 will be disposed over whichever graduation indicates the straight ahead position of the wheels.

In the use of the device it will be seen that in the event that the front wheels are turned at any angle away from the straight ahead position, the pointer 17 will be disposed over or near certain other ones of the graduations on the disk so that the operator may ascertain at a glance the exact position of the front wheels in order to avoid turning the front wheels too far in getting out of a rut in a country road or in getting out of a parking position among other vehicles. It is of course apparent that it is preferable that when the front wheels of a vehicle are in a straight ahead position the pointer 17 will be disposed at the forwardmost point and will register with the forwardmost designation or graduation on the disk.

In some vehicles it is to be noted that the spark and gas control levers which operate over a suitable quadrant are located at one side of the steering wheel in such a position as to preclude the use of a disk formed of the sections 10 as shown and described above. In such a case, it is necessary to make use of the structure shown in the modified form illustrated in Figure 4 of the drawings. In this instance, instead of using two similar semi-circular disk sections 10, I use a single disk section 18 which is formed with a semi-circular recess receiving the steering column and which is held in position by a retaining strip or strap 19 which engages against the side of the steering column at which the spark and gas control levers are located and which is suitably secured to the disk section 18. In this instance it is apparent that the split ring 14 carrying the pointer 17 should be adjusted with respect to the hub of the steering wheel so that it will point to the center of the disk section when the front wheels of the vehicle are in straight ahead position. It is also to be observed that in this case the disk section 18 would be provided at its center with a graduation indicating straight ahead position and that at the sides of said central graduation would be provided other graduations which would clearly designate or indicate the position of the front wheels. The operation of this form is of course exactly the same as that of the first described form. In some types of motor vehicles the steering column is not stationary but turns with the steering wheel and rotates through a guide casing C which is secured upon or which may form a part of the dash. In the second modified form of my invention shown in Figure 5 of the drawings I have illustrated how my device is adapted for association with such a structure. In this instance I provide a disk member 20 which is provided with graduations similar to the graduations on the previously described disk member and which is secured to the dash or casing. It will be readily apparent that the disk 20 may have any one of a variety of different shapes and that it might be formed of separate semi-circular sections embracingly engaged with respect to the steering column and secured upon the dash or that the disk might be formed with a radial slot 21 for the accommodation of the steering column when the disk is secured upon the dash. This feature is a mere matter of design and is not essential to the spirit of the invention. In this form of the invention I also make use of a split-ring member 22 similar to the split-ring 14 and clampingly engaged upon the steering column and provided with an arrow head or pointer 23 cooperating with the graduations on the disk 20 in exactly the same manner as in the previously described two forms.

In Figure 9 I have shown an arrangement whereby my device may be used satisfactorily in association with a steering mechanism of such types that there is no hub to the steering wheel upon which my indicator or pointer may be secured. In this form, I provide a suitable indicating dial or segment 25 which is secured either upon the guide casing within which the steering post is revoluble or which is secured upon the steering column in case that the latter is stationary, this disk being provided with graduations in exactly the same manner as in the previously described forms. However, instead of securing the pointer or indicator member upon the hub of the steering wheel by the means previously described, I provide an indicator which includes an elongated bar or strip 26 which is secured as shown at 27 at its ends upon adjacent spokes of the steering wheel, this bar or strip being formed intermediate its ends and at its outer edge with a pointer of preferably arrow like formation indicated by the numeral 28 which is designed to move over and cooperate with the graduations on the disk 25.

The operation of this form of this device is naturally the same as that of the above described form and it will be seen that in all forms the indicator carried by the steering column or by the hub of the steering wheel, as the case may be, cooperating with the graduations on the stationary disk, regardless of whether the latter be clamped upon the steering column or be secured upon the dash, will quickly apprise the operator of the vehicle of the exact position of the front wheels in order to avoid any accidents or unfortunate occurrence under various emergencies.

From the foregoing description and the study of the drawings it will be apparent that I have thus provided a simply constructed and consequently inexpensive indicating device by means of which the operator may at all times be aware of the exact position of the front wheels of the vehicle, this knowledge being of great value in the event that the operator is endeavoring to get the vehicle out of a rut in a country road or is attempting to get away from the curb among a large number of other vehicles which are parked nearby.

While I have shown and described the preferred embodiments of the invention, it is of course to be understood that I reserve the right to make such changes in the form, construction and arrangement of parts as will not depart from the spirit of the invention or the scope of the subjoined claims.

Having thus described my invention I claim;

In combination with a stationary steering column and with the rotary steering wheel of a motor vehicle, means for ascertaining the exact position of the front wheels comprising a disk member clampingly engaged upon the steering column and provided with a plurality of graduations, in combination with a pointer member detachably engaged upon and adjustably mounted upon the hub of the steering wheel and having a pointer cooperating with the graduations on said disk.

In testimony whereof I affix my signature.

FRANK J. HESS.